(12) United States Patent
Kurumado

(10) Patent No.: US 7,301,331 B2
(45) Date of Patent: Nov. 27, 2007

(54) MAGNETIC SENSOR DEVICE HAVING COMPONENTS MOUNTED ON MAGNET

(75) Inventor: Norihiro Kurumado, Kasugai (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 11/199,229

(22) Filed: Aug. 9, 2005

(65) Prior Publication Data

US 2006/0038560 A1   Feb. 23, 2006

(30) Foreign Application Priority Data

Aug. 19, 2004  (JP) .............................. 2004-239843

(51) Int. Cl.
  G01B 7/14  (2006.01)
  G01B 7/30  (2006.01)
  G01R 33/06 (2006.01)

(52) U.S. Cl. ........................... 324/207.21; 324/207.22; 324/207.24; 324/207.25; 324/228; 324/252; 324/173

(58) Field of Classification Search .......... 324/207.21, 324/207.22, 207.24, 207.25, 228, 252, 173
See application file for complete search history.

(56) References Cited

FOREIGN PATENT DOCUMENTS

| JP | 02242180 | * | 9/1990 |
|---|---|---|---|
| JP | A-9-196701 | | 7/1997 |

OTHER PUBLICATIONS

Office Action issued in the corresponding Chinese patent application No. 200510091678.6 on May 18, 2007.

* cited by examiner

Primary Examiner—Reena Aurora
(74) Attorney, Agent, or Firm—Posz Law Group, PLC

(57) ABSTRACT

A magnetic sensor device is used for detecting, e.g., a rotational speed of a rotor made of a magnetic material by sensing changes in a magnetic field. The magnetic sensor device is composed of a magnet, electronic components including a sensor chip and wiring for electrically connecting the electronic components. The wiring is formed on a surface of the magnet, and the electronic components are directly mounted on the wiring and electrically connected to the wiring. Alternatively, the electronic components are mounted on the magnet and electrically connected to the wiring via bonding wires. In this manner, a reed frame or a printed circuit board on which the electronic components are mounted can be eliminated to thereby reduce the number of parts used in the magnetic sensor device.

3 Claims, 5 Drawing Sheets

MAGNETIC SENSOR DEVICE HAVING COMPONENTS MOUNTED ON MAGNET

CROSS-REFERENCE TO RELATED APPLICATION

This application is based upon and claims benefit of priority of Japanese Patent Application No. 2004-239843 filed on Aug. 19, 2004, the content of which is incorporated herein by reference.

BACKGROUND OF THE INVENTION

1. Field of the Invention

The present invention relates to a magnetic sensor device such as a magnetic sensor that includes a magnetoresistance element for sensing a motion of a magnetic member.

2. Description of Related Art

An example of a magnetic sensor is disclosed in JP-A-9-196701. A relevant portion of the magnetic sensor is illustrated in FIGS. 9 and 10 attached hereto. The magnetic sensor includes a sensor chip 31 having a first MRE pair 1 consisting of magnetoresistance elements MRE1 and MRE2, and a second MRE pair 2 consisting of magnetoresistance elements MRE3 and MRE4. The sensor chip 31 is positioned to face a rotor RT having teeth made of a magnetic material. The sensor chip 31 and a circuit chip 32 that amplifies signals from the sensor chip 31 and/or converting the signals to binary signals are mounted on a reed frame 33 and molded together with molding resin 34, forming a molded unit. A power source terminal T1, an output terminal T2 and a ground terminal T3 are led out from the molded unit.

The magnetic sensor also includes a biasing magnet 35 that has a groove 35a extending in the longitudinal direction of the biasing magnet 35a. The molded unit including the sensor chip 31 and the circuit 32 is mounted on a bottom surface of the groove 35a and pasted with adhesive. Thus, magnetoresistance elements in the sensor chip 31 are placed in a biasing magnetic field.

According to rotation of the rotor RT, a magnetic field, in which the magnetoresistance elements MRE1-MRE4 are placed, changes. Electrical resistances of these elements vary in response to changes in the magnetic field. A rotational speed of the rotor RT is detected as changes in the electrical resistances of the magnetoresistance elements. MRE1-MRE4 form a bridge circuit, and outputs from the bridge circuit are processed by the circuit chip 32 and taken out from the output terminal T2.

Components of the magnetic sensor such as the sensor chip 31 and the circuit chip 32 are mounted on a reed frame 33 and molded together, forming a molded unit. Then, molded unit is mounted on the magnet 35. Alternatively, the components are connected to a printed circuit board, and then the circuit board is mounted on the magnet 35. In such a conventional structure, a reed frame or a circuit board for mounting components thereon is anyway required, resulting in increase in manufacturing costs.

SUMMARY OF THE INVENTION

The present invention has been made in view of the above-mentioned problem, and an object of the present invention is to provide an improved magnetic sensor device in which the number of components used in the sensor device is reduced while providing a structure for easily mounting these components.

The magnetic sensor device is used for detecting changes in a magnetic field caused by a moving magnetic member. For example, the magnetic sensor device is positioned close to a magnetic rotor for detecting a rotational speed of the magnetic rotor. The magnetic sensor device includes a magnet for generating a biasing magnetic field, electronic components mounted on the magnet and wiring formed on the magnet for electrically connecting the electronic components.

The wiring is formed on a surface of the magnet by printing or the like. The electronic components including a sensor chip and a circuit chip for processing output signals of the sensor chip are mounted on the surface of the magnet and electrically connected to the wiring formed on the surface of the magnet. The sensor chip includes a bridge formed by magnetoresistance elements for sensing changes in a magnetic field. The electronic components may be directly mounted on the wiring and directly connected to the wiring. Alternatively, they may be mounted on the magnet and electrically connected to the wiring via bonding wires.

A groove extending toward the magnetic rotor, a rotational speed of which is to be detected, may be formed on the magnet. In this case, the wiring is formed on a bottom surface of the groove, and the electronic components are mounted on the bottom surface and electrically connected to the wiring. After the electronic components are disposed in the groove and connected to the wiring, these components are molded with a molding resin together with the wiring.

Preferably, a plastic magnet is used as the magnet for generating the biasing magnetic field. In this case, part of the wiring may be embedded in the plastic magnet in a process of molding the plastic magnet. The magnet may be formed in a shape having a hollow space therein. In this case, the wiring is formed on an inner wall of the hollow space and the electronic components are mounted on the inner wall and electrically connected to the wiring formed on the inner wall.

According to the present invention, a reed frame or a printed circuit board on which the electronic components are mounted can be eliminated, thereby reducing the number of components forming the magnetic sensor device. Further, the electronic components are easily mounted on and electrically connected to the wiring formed on the surface of the magnet. Other objects and features of the present invention will become more readily apparent from a better understanding of the preferred embodiment described below with reference to the following drawings.

DETAILED DESCRIPTION OF THE PREFERRED EMBODIMENT

Figure 1:
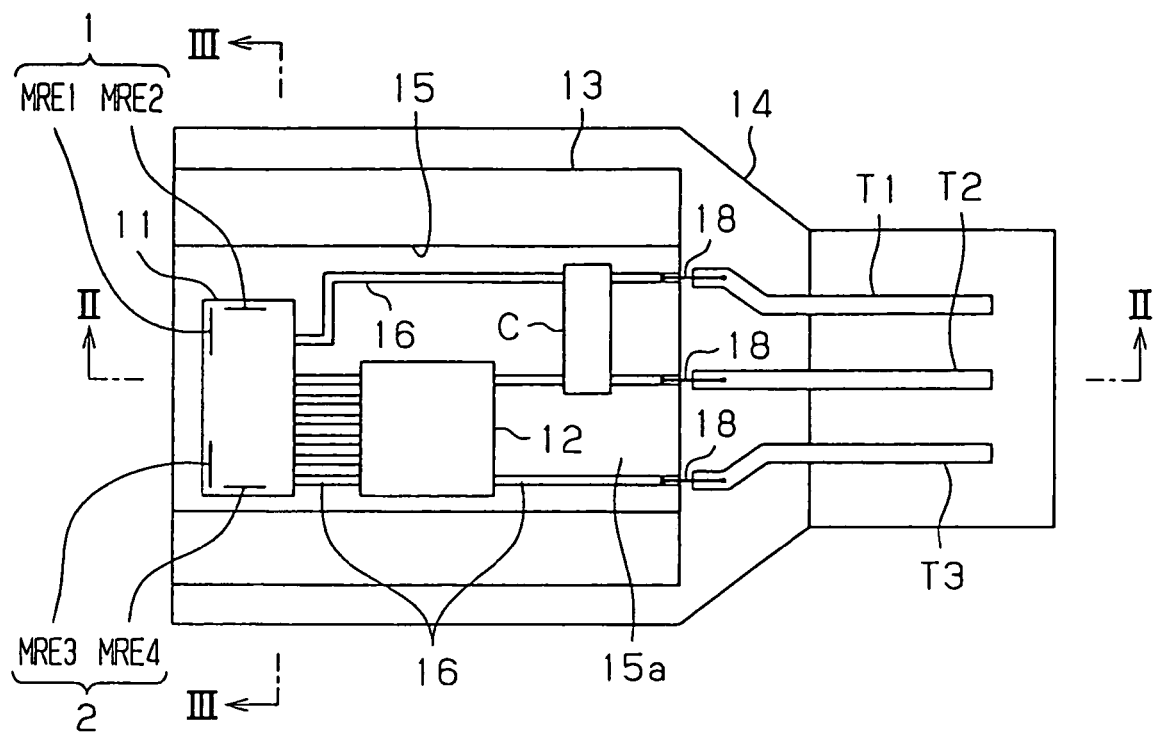
FIG. 1 is a plan view showing a magnetic sensor device according to the present invention.

A preferred embodiment of the present invention will be described with reference to FIGS. 1-3. A magnetic sensor shown in FIG. 1 is used, for example, as a sensor for detecting a rotational speed of a rotating magnetic object. The magnetic sensor is positioned to face the rotating object. As shown in FIG. 1, the magnetic sensor includes a sensor chip 11, a circuit chip 12, a capacitor C, a biasing magnet 13 and other associated components. These components are all contained in a casing 14.

The sensor chip 11 is composed of a first pair 1 of magnetoresistance elements MRE1, MRE2 and a second pair 2 of magnetoresistance elements MRE3, MRE4. The circuit chip 12 amplifies electrical signals outputted from the sensor chip 11 and/or changes the signals into binary signals. The capacitor C reduces influence of noises on the sensor chip 11 and the circuit chip 12. The biasing magnet 13 provides a biasing field to the sensor chip 11. The biasing magnet 13 has a U-shaped cross-section, and a groove 15 forming the U-shape extends toward a magnetic rotor, a rotational speed of which is to be detected by the sensor device. The biasing magnet 13 has its N-pole at a position close to the magnetic rotor and its S-pole at a remote side. The biasing magnet 13 is a plastic magnet in this particular embodiment although other types of magnets can be used.

Figure 2:
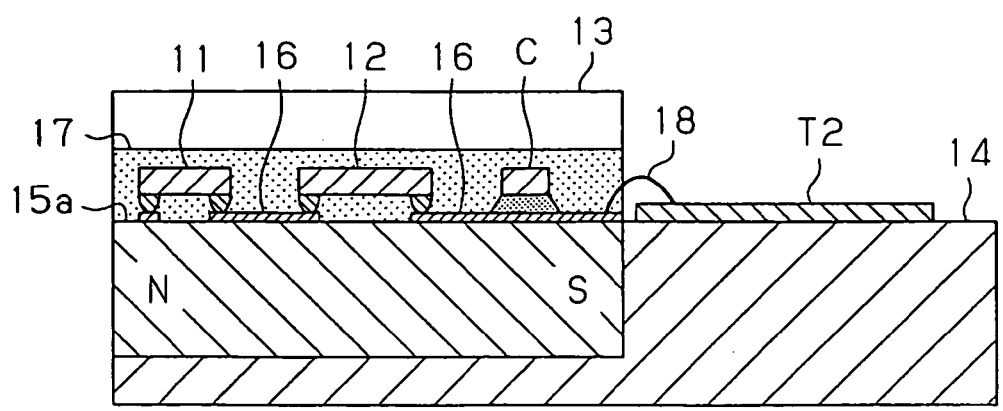
FIG. 2 is a cross-sectional view showing the magnetic sensor device, taken along line II-II in FIG. 1.
Figure 3:
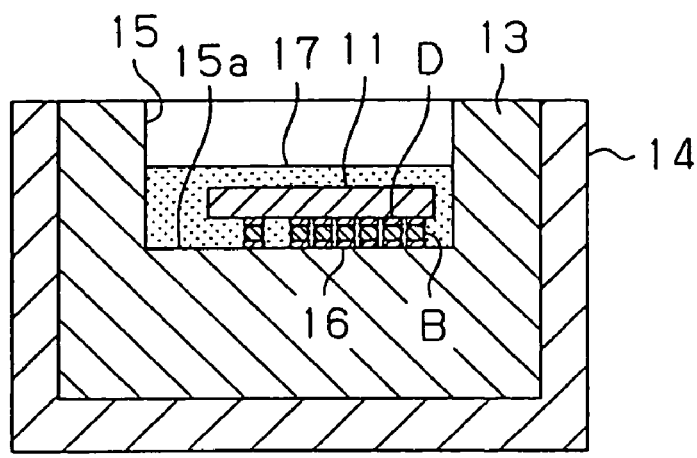
FIG. 3 is a cross-sectional view showing the magnetic sensor device, taken along line III-III in FIG. 1.

As shown in FIGS. 1-3, wiring 16 consisting of plural wires is formed on and along a bottom surface 15a of the groove 15 formed in the biasing magnet 13. The sensor chip 11, the circuit chip 12 and other components are electrically connected by the wiring 16. The wiring 16 is formed by printing, vapor-depositing, plating, ink-jetting or the like. A power source terminal T1, an output terminal T2 and a ground terminal T3 are formed on the casing 14 and connected to the wiring 16 via bonding wires 18.

As shown in FIG. 2, the sensor chip 11 and the circuit chip 12 are directly mounted on the wiring 16 and electrically connected thereto. The capacitor C is directly connected to the wiring 16 with conductive adhesive. The sensor chip 11, the circuit chip 12 and the capacitor C are molded with molding resin 17 together with the wiring 16. As shown in FIG. 3, electrodes D of the sensor chip 11 are directly connected to the wiring 16 via ball-like solder bumps B. The circuit chip 12 is electrically connected to the wiring 16 in a similar manner. In other words, bare chips of these components are directly connected to the wiring 16 formed on the bottom surface 15a of the groove 15.

The magnetic sensor device described above is positioned to face a rotor made of a magnetic material, and detects changes in a magnetic field which is formed in the sensor chip 11 in cooperation with the magnetic field generated by the basing magnet 13 and the magnetic rotor. The changes in the magnetic field are detected as changes in the resistance of the magnetoresistance elements MRE1-MRE4. Thus, a rotational speed of the rotor is detected. The output signals from the sensor chip 11 are processed through the circuit chip 12 and outputted from the output terminal T2.

Advantages of the embodiment of the present invention described above will be summarized as below. The components including the sensor chip 11 and the circuit chip 12 are directly mounted and electrically connected to the wiring 16 formed on the bottom surface 15a of the groove 15. Therefore, no reed frame or a printed circuit board for mounting the components, which used to be necessary in a conventional magnetic sensor, is required. In addition, a distance between the sensor chip 11 and the biasing magnet 13 is shortened by directly mounting the sensor chip 11 on the biasing magnet 13. Accordingly, sensitivity of the magnetic sensor is improved.

The wiring 16 is directly formed on the bottom surface 15a of the groove 15 in the biasing magnet 13. Accordingly, the wiring 16 can be easily made by printing, vapor-depositing, plating, ink-jetting or the like, and the components can be easily connected to the wiring 16. The biasing magnet 13 has a U-shaped cross-section forming the groove 15. Therefore, components of the sensor device are properly accommodated in the groove 15, and the molding resin 17 is properly kept in the groove 15. Further, since the biasing magnet 13 is formed by a plastic magnet, the wiring 16 formed thereon is surely insulated from the magnet.

Figure 4:
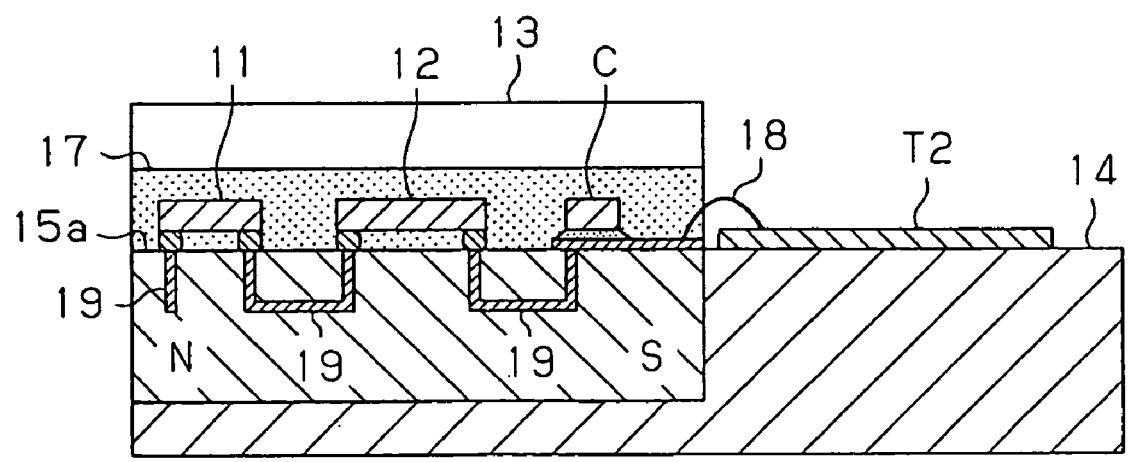
FIG. 4 is a cross-sectional view showing a modified form of the magnetic sensor device, the cross-sectional view corresponding to FIG. 2.

The present invention is not limited to the embodiment described above, but it may be variously modified. The followings are some examples of modified forms of the embodiment described above. As shown in FIG. 4, part of the wiring 19 may be embedded in the plastic magnet 13. The wiring 19 may be made by insert-molding together with the plastic magnet 13. The components including the sensor chip 11 and the circuit chip 12 are mounted on and connected to the part of the wiring exposed to the bottom surface 15a of the groove 15.

Figure 5:
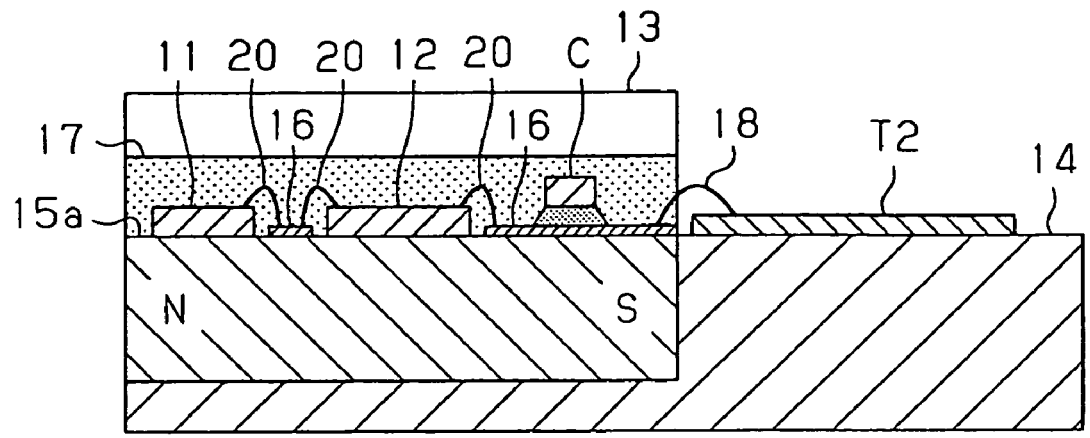
FIG. 5 is a cross-sectional view showing a modified form of the magnetic sensor device, the cross-sectional view corresponding to FIG. 2.

As shown in FIG. 5, the wiring 16 may be formed to extend to the vicinity of the components including the sensor chip 11 and the circuit chip 12, and the components may be indirectly connected to the wiring 16 via bonding wires 20. In this case, too, no reed frame or printed circuit board for mounting the components thereon is required.

Figure 6:
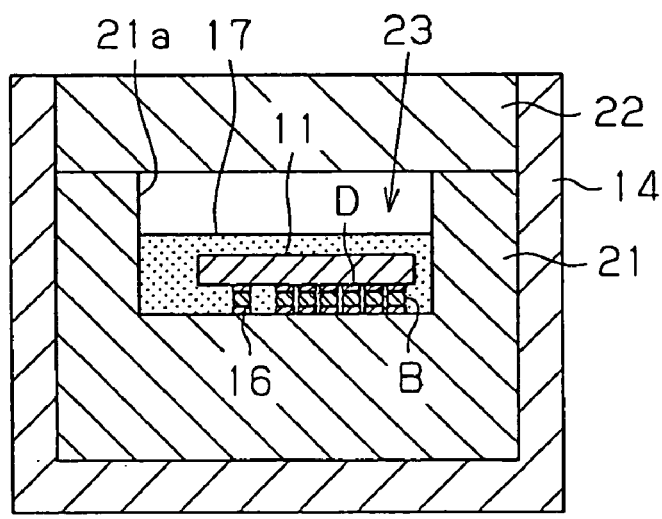
FIG. 6 is a cross-sectional view showing a modified form of the magnetic sensor device, the cross-sectional view corresponding to FIG. 3.

The biasing magnet 13 may be formed in a cylindrical or rod shape having a hollow space therein. For example, as shown in FIG. 6, the biasing magnet having an inner hollow space 23 may be formed by a U-shaped portion 21 and a flat plate 22 closing an opening of the U-shaped portion 21. The U-shaped portion 21 includes a groove 21a, which is similar to the groove 15 in the embodiment described above. The molded components of the magnetic sensor including the sensor chip 11 and the circuit chip 12 are contained in the groove 21a, and then the opening of the groove 21a is closed with the flat plate 22.

Figure 7A:
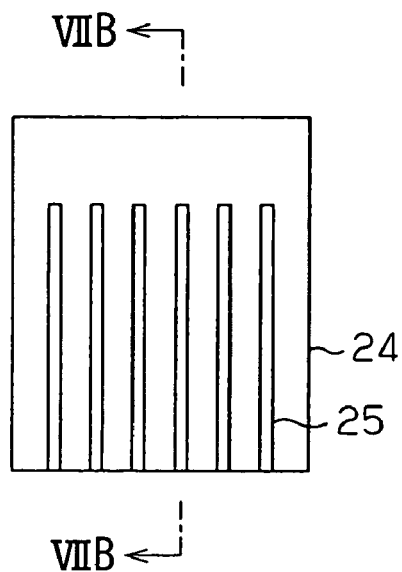
FIG. 7A is a plan view showing a modified form of a magnet on which wiring is formed.
Figure 7B:
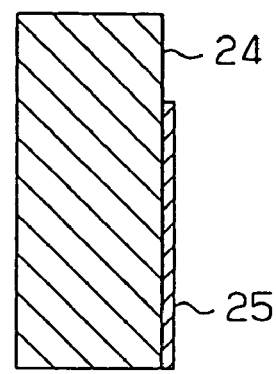
FIG. 7B is a cross-sectional view showing the magnet, taken along line VIIB-VIIB in FIG. 7A.
Figure 8A:
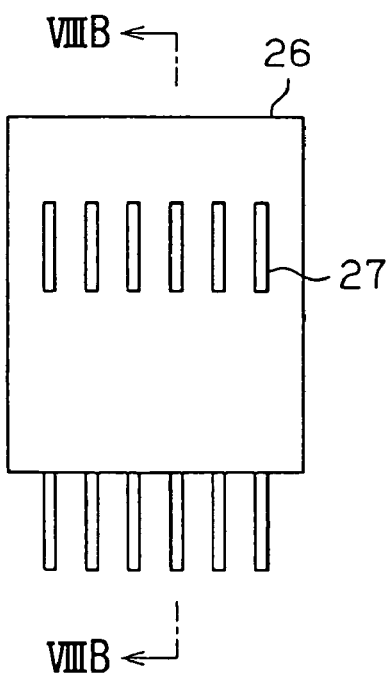
FIG. 8A is a plan view showing a modified form of a magnet including embedded wiring.
Figure 8B:
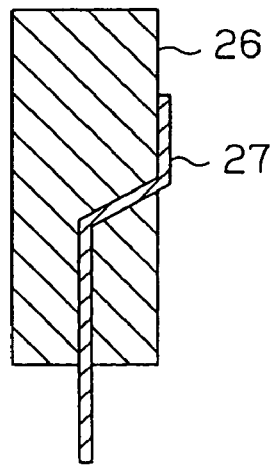
FIG. 8B is a cross-sectional view showing the magnet, taken along line VIIIB-VIIIB in FIG. 8A.
Figure 9:
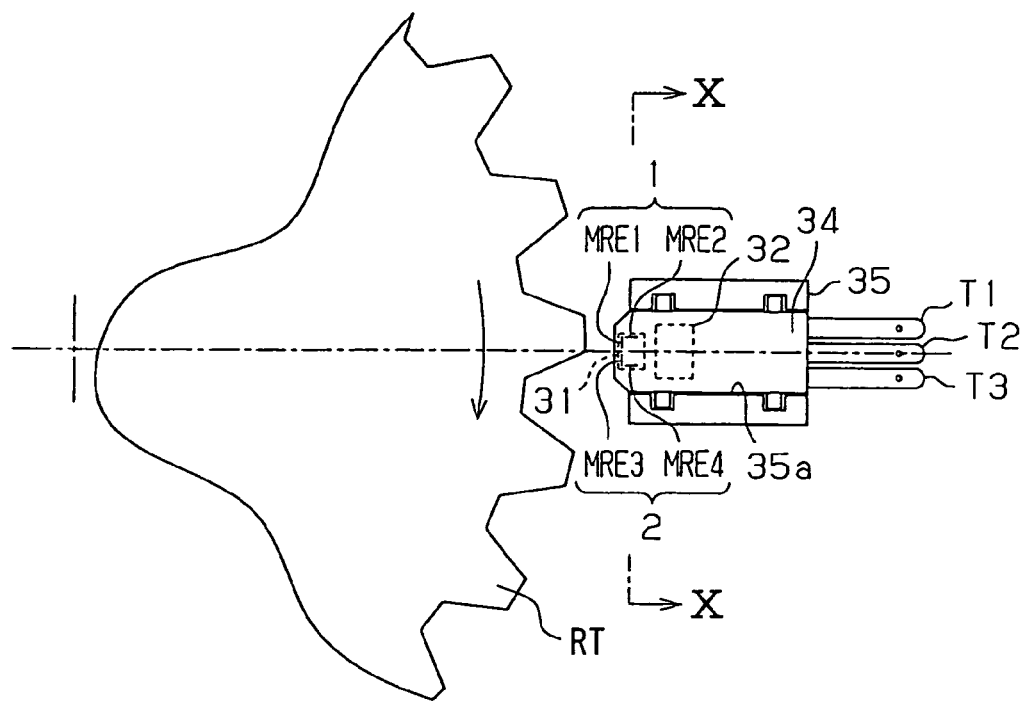
FIG. 9 is a plan view showing a conventional magnetic sensor for detecting rotational speed of a rotor made of a magnetic material.
Figure 10:
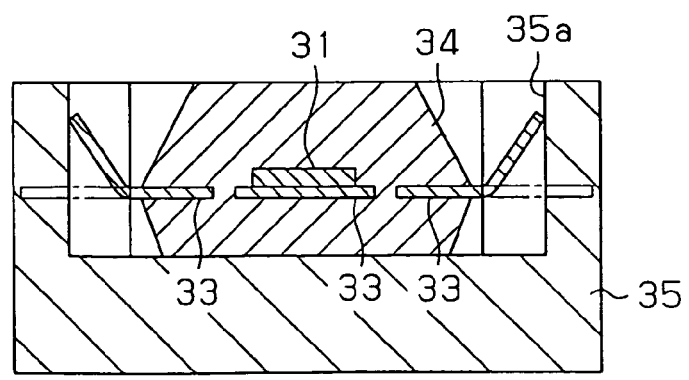
FIG. 10 is a cross-sectional view showing the magnetic sensor, taken along line X-X in FIG. 9.

The present invention may be applied also to magnetic devices other than the magnetic sensor, and the shape of the magnet may be variously modified. For example, as shown in FIGS. 7A and 7B, a box-shaped magnet 24 having wiring 25 formed on its surface may be used. Alternatively, as shown in FIGS. 8A and 8B, a part of wiring 27 may be embedded in a magnet 26, and another part of the wiring 27 may be formed on the surface of the magnet 26. A portion of the wiring 27 led out from the embedded portion may be used as a terminal. The components of the magnet device are directly mounted on the portion of the wiring 27 formed on the surface.

In the embodiment described above, the sensor chip 11 and the circuit chip 12 in the form of bare chips are directly mounted on the wiring 16 formed on the magnet 13. It is possible to mount these components in the form of packaged chips on the wiring 16. It is also possible to mount components having a flip-chip structure. The magnet is not limited to the plastic magnet. Other types of magnets may be used as long as the magnet has a non-conductive surface for forming the wiring thereon.

While the present invention has been shown and described with reference to the foregoing preferred embodiment, it will be apparent to those skilled in the art that changes in form and detail may be made therein without departing from the scope of the invention as defined in the appended claims.

What is claimed is:

1. A magnetic sensor device comprising:

a magnet;

wiring formed on the magnet; and electronic components mounted on the magnet and electrically connected to the wiring, wherein:

the electronic components comprise a sensor chip having magnetoresistance elements;

the magnet functions as a biasing magnet for giving the magnetoresistance elements a magnetic field;

the magnetoresistance elements detect changes in the magnetic filed caused by a moving magnetic member positioned close to the magnetoresistance elements;

the magnet is formed in a U-shape having a groove extending toward the moving magnetic member to face the same;

at least part of the wiring is formed on and along a bottom surface of the groove; and the sensor chip is mounted on the bottom surface of the groove and electrically connected to the wiring formed on the bottom surface of the groove.

2. A magnetic sensor device comprising:

a magnet;

wiring formed on the magnet; and electronic components mounted on the magnet and electrically connected to the wiring, wherein:

the electronic components comprise a sensor chip having magnetoresistance elements;

the magnet functions as a biasing magnet for giving the magnetoresistance elements a magnetic field;

the magnetoresistance elements detect changes in the magnetic filed caused by a moving magnetic member positioned close to the magnetoresistance elements;

the magnet has a hollow space formed therein;

at least part of the wiring is formed on an inner wall of the hollow space; and the sensor chip is mounted on the inner wall and electrically connected to the wiring formed on the inner wall.

3. The magnetic sensor device as in claim 2, wherein:

the hollow space of the magnet is formed by connecting a first portion having a U-shaped cross-section and a second portion having a flat plate shape for closing an opening of the U-shaped cross-section.

* * * * *